United States Patent [19]
Daughtry et al.

[11] Patent Number: 6,160,452
[45] Date of Patent: Dec. 12, 2000

[54] CIRCUITS AND METHODS FOR A MONITORING CIRCUIT IN A NETWORK AMPLIFIER

[75] Inventors: Earl A. Daughtry, Lawrenceville; Peter Sung Tri Hoang, Alpharetta, both of Ga.

[73] Assignee: ADC Telecommunications, Inc.

[21] Appl. No.: 09/121,244

[22] Filed: Jul. 23, 1998

[51] Int. Cl.[7] .................................................. H03F 3/16
[52] U.S. Cl. ............................................. 330/277; 330/296
[58] Field of Search ................................ 330/277, 296, 330/302, 292, 279

[56] References Cited

U.S. PATENT DOCUMENTS

| | | | |
|---|---|---|---|
| 3,388,338 | 6/1968 | Austin | 330/29 |
| 3,528,023 | 9/1970 | Jeffers | 330/35 |
| 3,796,952 | 3/1974 | Bayer | 324/130 |
| 4,075,576 | 2/1978 | Eden | 330/277 |
| 4,160,134 | 7/1979 | Carroll | 179/173.3 R |
| 4,178,559 | 12/1979 | Nichols | 330/296 |
| 5,220,419 | 6/1993 | Sklar et al. | 358/86 |
| 5,349,304 | 9/1994 | Ryat . | |

FOREIGN PATENT DOCUMENTS 281113  9/1988  European Pat. Off. ......... H03K 5/02

*Primary Examiner*—Robert Pascal
*Assistant Examiner*—Henry Choe
*Attorney, Agent, or Firm*—Fogg, Slifer & Polglaze, P.A.

[57] ABSTRACT

A monitoring circuit is provided. The monitoring circuit can be used to monitor signals in a cable network. The monitoring circuit includes first and second stages. The first stage has an input and an output. The input is coupled to an external circuit. The first stage scales a voltage received at its input. The second stage is coupled to the output of the first stage. The second stage has a high input impedance and a low output impedance. The second stage buffers a signal at the output of the first stage to an output of the second stage.

31 Claims, 2 Drawing Sheets

CIRCUITS AND METHODS FOR A MONITORING CIRCUIT IN A NETWORK AMPLIFIER

TECHNICAL FIELD OF THE INVENTION

The present invention relates generally to the field of communications and, in particular, to circuits and methods for a monitoring circuit in a network amplifier.

BACKGROUND

Coaxial cable networks are a common medium that is used to distribute video and audio programming to consumers with a higher quality than is typically achieved using conventional antennas connected to a television at each user's location. A cable network typically includes a head end that receives inputs or programming from a number of content providers, e.g., ABC, NBC, CBS, Fox, CNN, ESPN, etc. The head end is typically connected to a distribution network that distributes the programming from the head end to, for example, the television sets of a number of end users. The distribution network can include coaxial cable alone or in combination with optical fiber, or other distribution medium.

Radio frequency (RF) signals transmitted over a coaxial cable portion of the distribution network tend to attenuate as a function of distance from the head end. This means that the RF signals decrease in quality as they get further away from the head end. To compensate for this attenuation, cable networks typically include network amplifiers that are selectively distributed throughout the network. These amplifiers receive and amplify the RF signals at these selected points in the network such that the signals provided to each end user provide an acceptable level of quality.

Network amplifiers typically include two or more "monitoring circuits" that allow a network operator to monitor RF signals transmitted over the network and within the amplifier. Conventionally, a monitoring circuit uses a directional coupler that is placed within the RF signal path of the amplifier. The directional coupler includes a transformer, such as a double aperture balun device. The directional coupler couples monitored RF signals from the amplifier's RF signal path to, e.g., a test point connector, or an input of another circuit. The monitored RF signals are typically scaled down by a selected factor at the test point connector, e.g., 20 decibel (dB).

Network amplifiers conventionally include a monitoring circuit that is associated with the input port and a monitoring circuit that is associated with the output port of the amplifier. Further, the amplifier may also include other monitoring circuits that are used to provide internal feedback signals to circuits of the network amplifier such as an automatic gain control (AGC) circuit. The AGC circuit adjusts the level of the gain of the network amplifier so that the output is within an acceptable range.

One drawback with conventional monitoring circuits is a 1 dB maximum insertion loss created in the RF signal path of the amplifier by the monitoring circuit. This means that the monitoring circuit reduces or attenuates the RF signal output by the amplifier. This loss in signal strength reduces the effectiveness of the amplifier. This insertion loss is additive and applies to each monitoring circuit. Thus, a network amplifier with input, output and AGC monitoring circuits produce 3 dB reduction in signal strength. Additional monitoring circuits further increase the RF signal reduction.

Conventional attempts to overcome the RF signal reduction can add to or complicate other problems with the amplifier. For example, simply increasing the gain of the amplifier can be used to compensate for the 1 dB reduction caused by a monitoring circuit. However, the intermodulation distortion of the amplifier increases by 2 to 3 dB for every 1 dB in increase of the output level of the network amplifier. The intermodulation distortion is important to the perceived video fidelity of the composite signal in the cable network.

Use of a conventional monitoring circuit at the input of a network amplifier can add up to 1 dB of noise figure to the preamplifier noise figure for the network amplifier. Operating noise figure is an important factor is determining where to place amplifiers in a given network.

One additional problem with conventional monitoring circuits is that the directional couplers used have a limited bandwidth. That is, the directional coupler can only handle signals over a limited frequency range; typically, 5 to 860 MHZ with ±0.25 dB flatness. Currently, cable networks plan to expand the frequency range of the channels offered to go as high as 1000 MHZ. This will make the directional coupler a limiting factor in monitoring circuits.

For the reasons stated above, and for other reasons stated below which will become apparent to those skilled in the art upon reading and understanding the present specification, there is a need in the art for a circuit for monitoring RF signals in a network amplifier with reduced insertion loss and higher bandwidth capability.

SUMMARY OF THE INVENTION

The above mentioned problems with network amplifiers and other problems are addressed by the present invention and will be understood by reading and studying the following specification. A monitoring circuit is described which uses an active coupler to monitor signals in a network amplifier.

In particular, an illustrative embodiment of the present invention includes a monitoring circuit. The monitoring circuit can be used to monitor signals in a cable network. The monitoring circuit includes first and second stages. The first stage has an input and an output. The input is coupled to an external circuit. The first stage scales a voltage received at its input. The second stage is coupled to the output of the first stage. The second stage has a high input impedance and a low output impedance. The second stage buffers a signal at the output of the first stage to an output of the second stage.

In another embodiment, a monitoring circuit is provided. The monitoring circuit includes a voltage divider. The voltage divider has an input for coupling to a node of an external circuit and has an output. The voltage divider further includes a buffer circuit. The buffer circuit is coupled to the output of the voltage divider. The buffer circuit includes a field effect transistor with a gate coupled to the output of the voltage divider. The transistor is configured as a common-drain amplifier such that the source of the transistor provides an output of the monitoring circuit.

In another embodiment, a network amplifier is provided. The network amplifier includes an input port, an output port, and an amplifier circuit. The amplifier circuit is coupled between the input port and the output port along a signal path of the network amplifier. At least one monitoring circuit is coupled to the signal path. The monitoring circuit includes a first stage and a second stage. The first stage has an input and an output. The input of the first stage is coupled to the signal path. The first stage scales a voltage received at its input. The second stage is coupled to the output of the first stage. The second stage has a high input impedance and a low output impedance so as to buffer a signal at the output of the first stage to an output of the second stage.

In another embodiment, a method for monitoring a signal in a signal path of a cable network is provided. The method includes tapping the signal from the signal path of the cable network. The level of the tapped signal is reduced and buffered to provide an output of the circuit.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
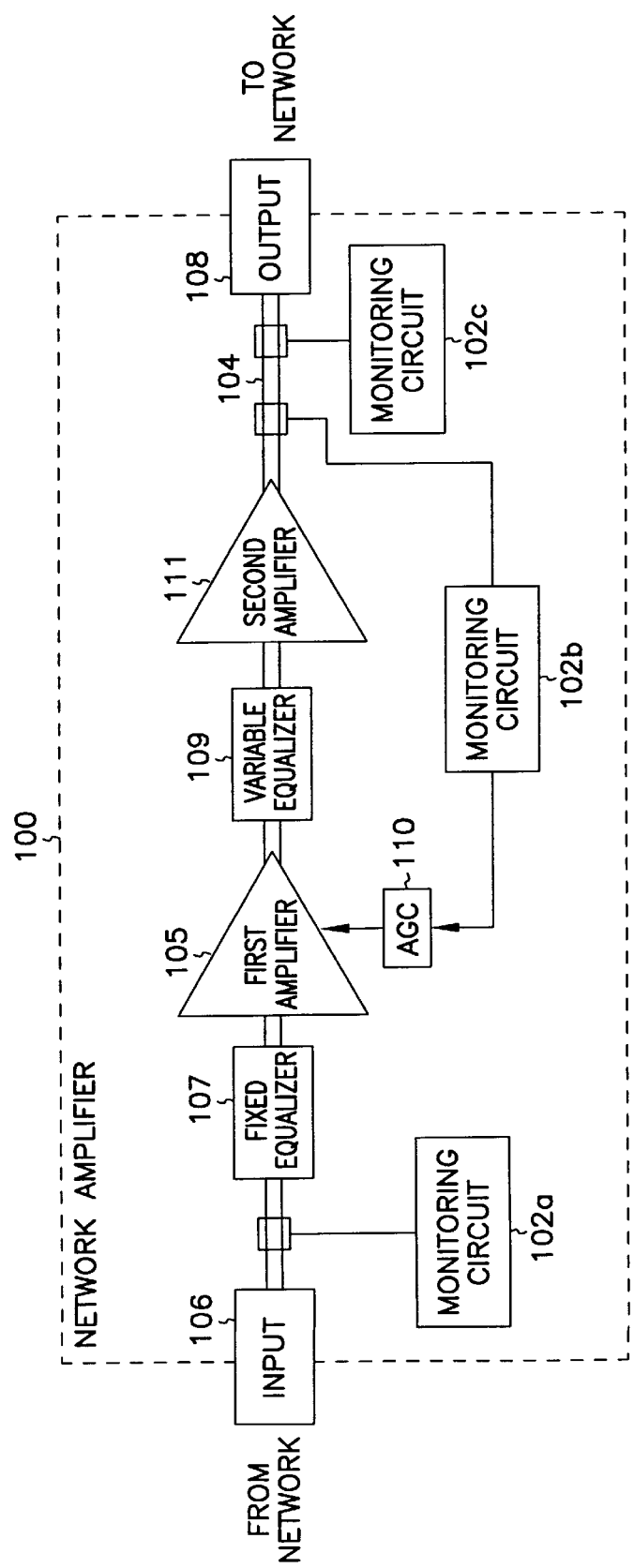
FIG. 1 is a block diagram of an embodiment of a network amplifier according to the teachings of the present invention.

FIG. 1 is a block diagram of an embodiment of a network amplifier, indicated generally at 100, constructed according to the teachings of the present invention. Network amplifier 100 is used to amplify signals in a network such as a cable television network. Network amplifier 100 includes a number of monitoring circuits 102a, 102b, and 102c that monitor signals in amplifier 100. For example, monitoring circuit 102a monitors signals in main path 104 at input port 106 of amplifier 100. Similarly, monitoring circuit 102c monitors signals in main path 104 at output port 108. Monitoring circuit 102b monitors signals in main path 104 and provides the signals to automatic gain control (AGC) circuit 110. AGC circuit 110 controls the gain of network amplifier 100 in response to signals monitored in path 104. Monitoring circuits 102a, 102b, and 102c each use a field effect transistor to monitor the signals in path 104 in order to avoid the problems with conventional monitoring circuits described in detail above.

Network amplifier 100 includes, in one embodiment, fixed equalizer 107, first amplifier 105, variable equalizer 109 and second amplifier 111 that are coupled in series along path 104. It is understood that these elements in path 104 are provided by way of illustration and not by way of limitation. Other arrangements and other elements can be used in this path to appropriately amplify the signal in path 104. Further, the number of monitoring circuits can be varied without departing from the scope of the present invention.

Figure 2:
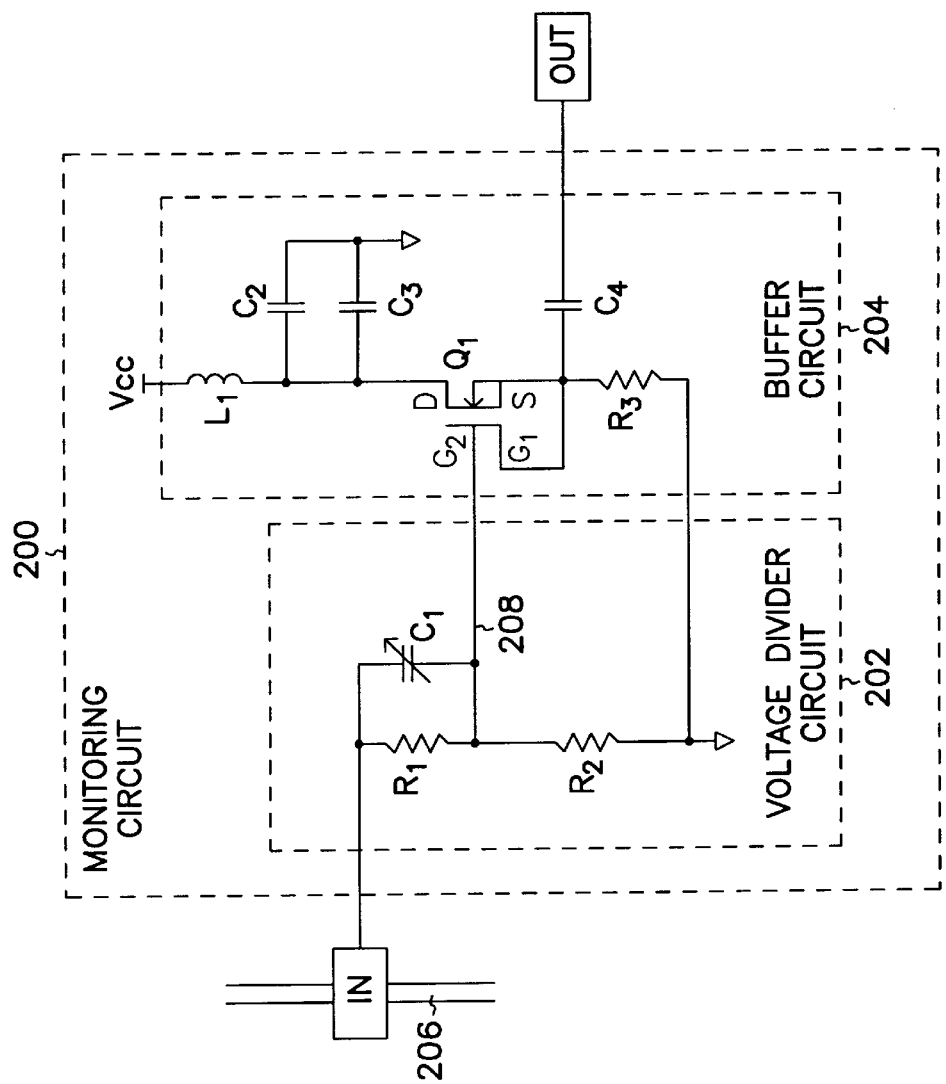
FIG. 2 is a schematic diagram of an embodiment of an active coupler for monitoring signals in a network amplifier according to the teachings of the present invention.

FIG. 2 is a schematic diagram of a monitoring circuit, indicated generally at 200, and constructed according to the teachings of the present invention. Advantageously, monitoring circuit 200 provides a wide-band, non-invasive technique for monitoring RF signals in an amplifier of a cable network with substantially no insertion loss. Monitoring circuit 200 includes two main portions; namely, voltage divider circuit 202 and buffer circuit 204. Monitoring circuit 200 is formed, for example, on a printed circuit board with input node (IN) coupled to main signal path 206 of, for example, an amplifier circuit such as amplifier 100 of FIG. 1. Input node IN comprises an electrical connection between signal path 206 and voltage divider circuit 202. In this embodiment, voltage divider 202 comprises a high impedance signal tap for monitoring circuit 200.

Voltage divider circuit 202 is used to reduce the signal level at input node IN down to a level appropriate for monitoring equipment, e.g., −20 dB. Voltage divider circuit 202 includes first and second resistors $R_1$ and $R_2$ that are connected in series between IN and ground such that resistors $R_1$ and $R_2$ form a voltage divider with an output at node 208. The values of $R_1$ and $R_2$ determine the voltage division factor, K, for voltage divider circuit 202 according to the following equation:

$$K = \frac{R_2}{(R_1 + R_2)}$$

The values of resistors $R_1$ and $R_2$ are chosen such that $R_1$ is much greater than $R_2$. Further, the coupling value for voltage divider circuit 202 is calculated according to the equation:

$$X = 20 \log(K)$$

In order to not load down the RF signal at the input node IN, the series combination of resistors $R_1$ and $R_2$ must be at least 10 times the characteristic impedance of the RF input (path 206), e.g., 10 times 75 ohms.

Voltage divider circuit 202 also provides transient surge protection to buffer circuit 204 by reducing the current with $R_1$, and the voltage with the factor K.

Optionally, capacitor $C_1$ is coupled in parallel with resistor $R_1$. The circumstances in which capacitor $C_1$ is used are described in detail below.

Buffer circuit 204 is included to reduce the loading effects of the monitoring equipment on the output of voltage divider 202. To this end, buffer circuit 204 includes high input impedance field-effect transistor $Q_1$. In one embodiment, transistor $Q_1$ is a gallium arsenide (GaAs) metal semiconductor field-effect transistor (MESFET) with a built-in static protection diode. Other appropriate transistors with high input impedance can be used in place of the gallium arsenide MESFET. To provide high input impedance and low output impedance, the MESFET transistor is configured as a common-drain amplifier. A gate of transistor $Q_1$ is coupled to node 208. A source of transistor $Q_1$ is coupled through resistor $R_3$ to ground. The source of transistor $Q_1$ is coupled through dc blocking capacitor $C_4$ to an output node (OUT). The signal at output node OUT can be passed, for example, to a 75 ohm test probe or other appropriate load.

Capacitors $C_2$ and $C_3$ are coupled in parallel between the drain of transistor $Q_1$ and ground to provide broadband RF bypassing for buffer circuit 204. Inductor $L_1$ is a choke to prevent the RF signals of monitoring circuit 200 from affecting the power supply, $V_{cc}$.

Due to the combined parasitic capacitance of the gate ($C_{gs}$) and the static protection diode in the MESFET embodiment, the output of monitoring circuit 200 at the output node may not be flat across the frequency spectrum of the signals processed by the associated amplifier. Capacitor $C_1$ of voltage divider circuit 202 can be adjusted to improve the flatness of the output of monitor circuit 200.

In operation, monitoring circuit 200 passes a signal from path 206 at input node (IN) to output node (OUT) with a specified attenuation for monitoring signals on signal path 206. In one embodiment, the attenuation is 20 dB to allow conventional testing/monitoring equipment to be coupled to output node (OUT). Voltage divider circuit 208 divides the signal from input node IN down to an attenuated voltage at node 208. This signal is passed to output node OUT by transistor $Q_1$ where it is provided to a test probe or other appropriate circuit.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the monitoring circuit can be used in a number of applications. For example, the monitoring circuit can be used to monitor an output signal to determine automatic gain/slope control settings for a distribution amplifier. Further, the monitoring circuit can be used as a test mode monitoring point at either the input or output of an amplifier. The monitoring circuit can also be used as the forward path status monitoring pick-off point to receive control signals from the head end. The monitoring circuit can be used in other appropriate applications. The blocking capacitor ($C_4$) can be removed. Further, the adjustable capacitor ($C_1$) of FIG. 2 can be removed when parasitic capacitance at node 208 is deemed sufficiently small.

What is claimed is:

1. A monitoring circuit, comprising:
   a voltage divider leaving an input for receiving a signal to be monitored and for coupling to a node of an external circuit and having an output;
   a buffer circuit, coupled to the output of the voltage divider; and
   wherein the buffer circuit includes a field effect transistor with a gate coupled to the output of the voltage divider, the transistor configured as a common-drain amplifier such that the source of the transistor provides an output of the monitoring circuit.

2. The monitoring circuit of claim 1, wherein the field effect transistor comprises a gallium arsenide metal semiconductor field-effect transistor.

3. The monitoring circuit of claim 2, wherein the transistor includes a static protection diode between the source and gate of the transistor.

4. The monitoring circuit of claim 1, wherein the voltage divider circuit includes an adjustable capacitor to compensate for parasitic capacitance of the transistor.

5. The monitoring circuit of claim 1, wherein the buffer circuit further includes a choke inductor coupled to the drain of the transistor.

6. The monitoring circuit of claim 1, wherein the buffer circuit includes a dc blocking capacitor on its output.

7. The monitoring circuit of claim 1, wherein the voltage divider comprises first and second resistors coupled in series between an input to the voltage divider and ground, wherein the first resistor has a greater resistance than the second resistor and the sum of the first and second resistor is at least 10 times the characteristic impedance of the external circuit.

8. A monitoring circuit, comprising:
   a first stage including a voltage divider having an input and an output, the input coupled to an external circuit for receiving a signal to be monitored;
   the first stage scaling a voltage received at its input; and
   a second stage, coupled to the output of the first stage, the second stage having a high input impedance and a low output impedance so as to buffer a signal at the output of the first stage to an output of the second stage.

9. The monitoring circuit of claim 8, wherein the first stage includes a high impedance signal tap.

10. The monitoring circuit of claim 8, wherein the first stage comprises a voltage divider.

11. The monitoring circuit of claim 10, wherein the voltage divider comprises first and second resistors coupled in series between an input to the voltage divider and ground, wherein the first resistor has a greater resistance than the second resistor and the sum of the first and second resistors is at least 10 times the characteristic impedance of the external circuit.

12. The monitoring circuit of claim 8, wherein the second stage comprises a field effect transistor with a gate coupled to the output of the first stage, the transistor configured as a common-drain amplifier such that the source of the transistor provides an output of the monitoring circuit.

13. The monitoring circuit of claim 12, wherein the field effect transistor comprises a gallium arsenide metal semiconductor field-effect transistor.

14. The monitoring circuit of claim 13, wherein the transistor includes a static protection diode between the source and gate of the transistor.

15. The monitoring circuit of claim 14, wherein the first stage includes an adjustable capacitor to compensate for the parasitic capacitance of the field-effect transistor.

16. The monitoring circuit of claim 12, wherein the second stage further includes a choke inductor coupled to the drain of the transistor.

17. The monitoring circuit of claim 8, wherein the second stage includes a dc blocking capacitor on its output.

18. A network amplifier, comprising:
   an input port;
   an output port;
   an amplifier circuit coupled between the input port and the output port along a signal path of the network amplifier; and
   at least one monitoring circuit coupled to the signal path, the monitoring circuit including:
   a first stage including a voltage divider having an input and an output, the input coupled to the signal path for receiving a signal to be monitored;
   the first stage scaling a voltage received at its input, and
   a second stage, coupled to the output of the first stage, the second stage having a high input impedance and a low output impedance so as to buffer a signal at the output of the first stage to an output of the second stage.

19. The network amplifier of claim 18, wherein the at least one monitoring circuit includes a monitoring circuit that is coupled to the signal path at the input port of the network amplifier.

20. The network amplifier of claim 18, wherein the at least one monitoring circuit includes a monitoring circuit that is coupled to the signal path at the input port of the network amplifier.

21. The network amplifier of claim 18, wherein the at least one monitoring circuit includes a monitoring circuit with an input coupled to the signal path and an output coupled to an input of an automatic gain control circuit, the automatic gain control circuit coupled to a control input of the amplifier circuit.

22. The network amplifier of claim 18, wherein the first stage includes a high impedance signal tap.

23. The network amplifier of claim 18, wherein the first stage comprises a voltage divider.

24. The network amplifier of claim 23, wherein the voltage divider comprises first and second resistors coupled in series between an input to the voltage divider and ground, wherein the first resistor has a greater resistance than the second resistor and the sum of the first and second resistors is at least 10 times the characteristic impedance of the external circuit.

25. The network amplifier of claim 18, wherein the second stage comprises a field effect transistor with a gate coupled to the output of the first stage, the transistor configured as a common-drain amplifier such that the source of the transistor provides an output of the monitoring circuit.

26. The network amplifier of claim 25, wherein the field effect transistor comprises a gallium arsenide metal semiconductor field-effect transistor.

27. The network amplifier of claim 26, wherein the transistor includes a static protection diode between the source and gate of the transistor.

28. The network amplifier of claim 27, wherein the first stage includes an adjustable capacitor to compensate for the parasitic capacitance of the transistor.

29. A method for monitoring a signal in a signal path of a cable network, the method comprising:

receiving a signal to be monitored from the signal path of the cable network at an input of a voltage divider;

reducing the signal level of the signal from the signal path with the voltage divider; and buffering the signal with a buffer circuit including a common-drain amplifier to provide the signal to another circuit.

30. The method of claim 29, wherein reducing the signal level tapped from the signal path comprises dividing the voltage of the signal with a voltage divider circuit.

31. The method of claim 29, wherein buffering the signal comprises buffering the signal with a field effect transistor in a common-drain configuration.

* * * * *

UNITED STATES PATENT AND TRADEMARK OFFICE
CERTIFICATE OF CORRECTION

PATENT NO. : 6,160,452
DATED : December 12, 2000
INVENTOR(S) : Daughtry et al.

It is certified that error appears in the above-identified patent and that said Letters Patent is hereby corrected as shown below:

Column 5,
Line 28, please replace "leaving" with -- having --.

Signed and Sealed this

Thirtieth Day of August, 2005

JON W. DUDAS
*Director of the United States Patent and Trademark Office*